No. 712,546. Patented Nov. 4, 1902.
O. W. KELLY.
MOTOR VEHICLE.
(Application filed May 31, 1902.)
(No Model.) 3 Sheets—Sheet 2.

WITNESSES:
INVENTOR.
BY
ATTORNEYS

No. 712,546. Patented Nov. 4, 1902.
O. W. KELLY.
MOTOR VEHICLE.
(Application filed May 31, 1902.)
(No Model.) 3 Sheets—Sheet 3.
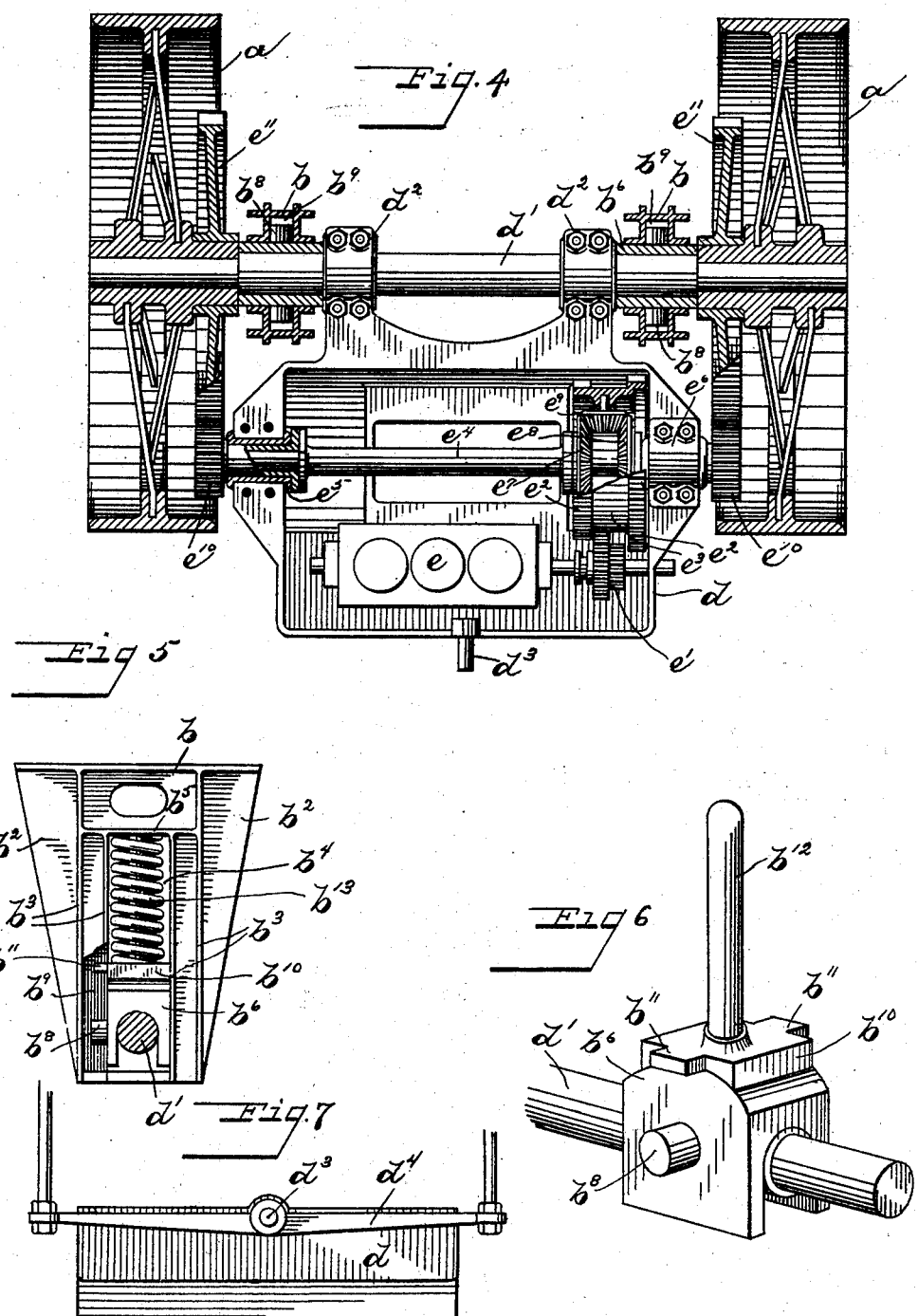
WITNESSES:
INVENTOR
Oliver W Kelly
BY
ATTORNEYS Dash

UNITED STATES PATENT OFFICE.

OLIVER W. KELLY, OF SPRINGFIELD, OHIO.

MOTOR-VEHICLE.

SPECIFICATION forming part of Letters Patent No. 712,546, dated November 4, 1902.

Application filed May 31, 1902. Serial No. 109,673. (No model.)

*To all whom it may concern:*

Be it known that I, OLIVER W. KELLY, a citizen of the United States, residing at Springfield, in the county of Clark and State of Ohio, have invented certain new and useful Improvements in Motor-Vehicles, of which the following is a specification.

My invention relates to self-propelling vehicles, and more especially relates to steam carriages or drays, although other motive power may be employed.

The object of my invention is to provide a simple, strong, and efficient construction for carrying heavy loads, so arranged as to compensate for the jars and strains incident to travel over uneven roads.

A further object of my invention is to so combine and arrange the parts that the platform of the carrying-body shall be at the top of the frame structure and the self-propelling devices underneath the platform, thus giving free and easy access to the platform of the carrying-body.

My invention consists of the constructions and combinations hereinafter described, and set forth in the claims.

Figure 1:
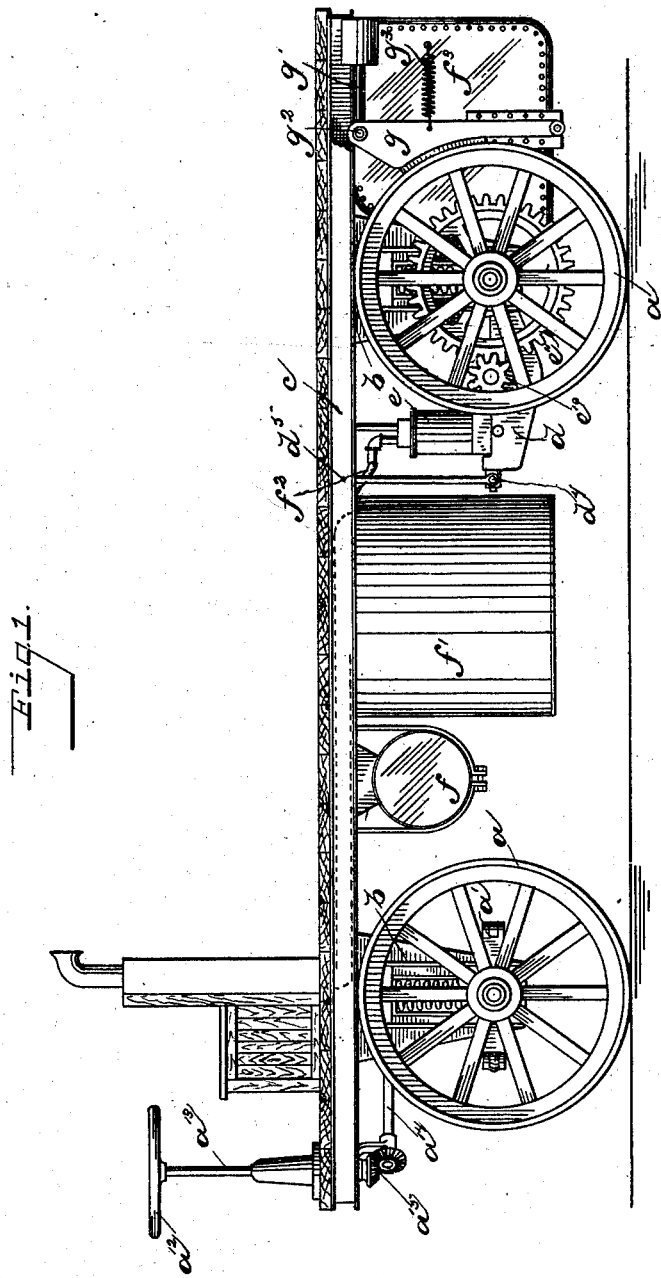
Figure 2:
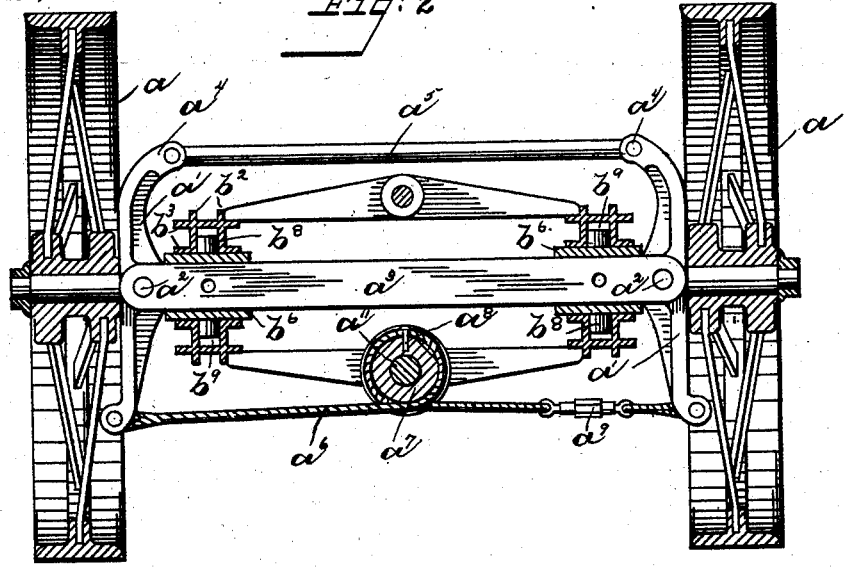
Figure 3:
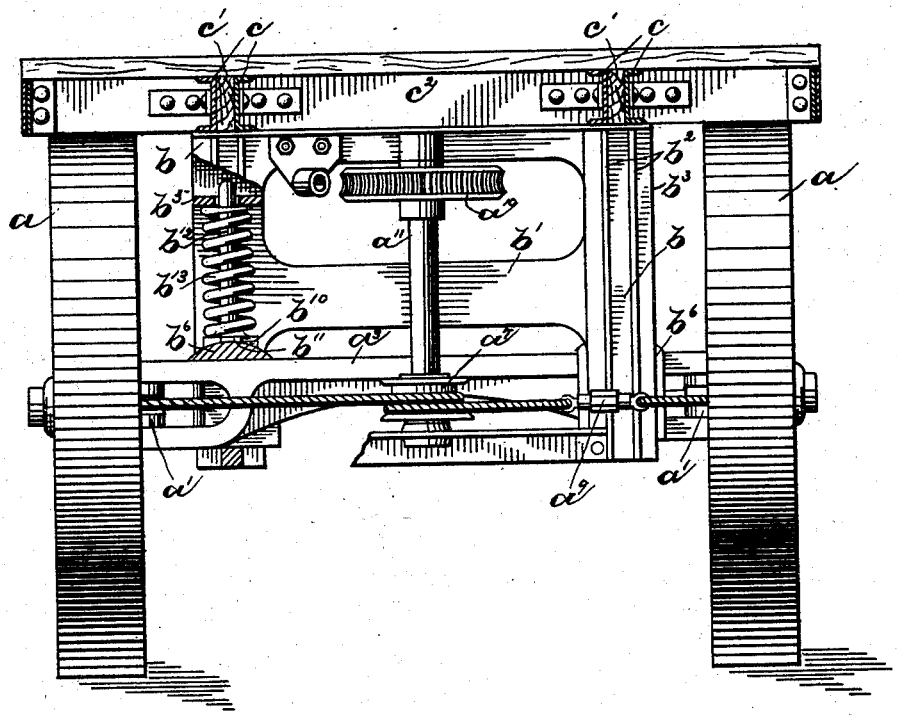

In the accompanying drawings, Figure 1 is a side view of a steam-dray embodying my invention. Fig. 2 is an end view of the front wheels and frame, partly broken away to show the carrying-spring, also the arrangement of the steering apparatus. Fig. 3 is a horizontal section of said wheels and frame, with a plan view, partly in section, of said steering apparatus. Fig. 4 is a horizontal section of the rear wheels and frame, with a plan view of the motor, its carrying-frame, and driving connections. Fig. 5 shows the platform-supports. Fig. 6 is a detail of same, and Fig. 7 shows pivoted connection of motor-carrying frame to platform.

Like parts are represented by similar letters of reference in the several views.

In the drawings, $a$ represents the carrying-wheels, preferably formed with staggered spokes and having the hubs in the rear wheels inwardly extended, so as to carry the spur-gears hereinafter mentioned. Spindles for the front wheels are preferably formed with the laterally and oppositely extending arms $a'$, pivoted at $a^2$ to the axle $a^3$, the ends $a^4$ of said levers being pivoted together by the cross-bar $a^5$, and the opposite ends being connected by a flexible rope $a^6$, turned around the drum $a^7$ and fastened to said drum at $a^8$, the tension of said rope being adjusted by a screw-threaded connection $a^9$. The drum $a^7$ and the worm-gear $a^{10}$ are rigidly attached to the shaft $a^{11}$ and are operated by the hand-wheel $a^{12}$ through the shafts $a^{13}$ and $a^{14}$ and the gears $a^{15}$, the worm for said worm-gear not being shown. The rope $a^6$ is preferably of a flexible or pliable material, so as to be somewhat elastic, which will give easier control to the steering apparatus.

The body-carrying supports are preferably cast in one piece, and to make them as light as consistent with the required strength I preferably cast them of malleable iron or steel, having the ends parts $b$, joined by the connecting-webs $b'$, and I further lighten them by forming the end parts with the centrally-extending webs $b^2$ and the laterally-extending ribs $b^3$ to strengthen them. The end parts $b$ have the slots $b^4$ and the bridge $b^5$ at the top of same.

I provide the blocks $b^6$ with the recess $b^7$ to rest over the axle and the laterally-extending pins $b^8$ to travel in grooves $b^9$, formed in the supports at the side of the slots to guide the blocks in said slots. I preferably form the tops of these blocks rounding, upon which the correspondingly-rounded bottom of the spindle-base $b^{10}$ is adapted to rest, said base having the lateral projections $b^{11}$, adapted to travel in the groove $b^9$ of said supports. The spindle $b^{12}$ is rigidly attached to or formed integrally with said base and extends through a perforation in the bridge $b^5$, and a carrying-spring $b^{13}$, through which the spindle projects, extends between the base $b^{10}$ and the bridge $b^5$ of the support.

It will be seen that the arrangement is such as to give a loose but strong construction adapted to compensate for the various strains incident to travel over uneven roads or obstructions, the rounded connection between the block and base especially taking care of the variation in vertical movement of the respective sides of the machine.

On the supports I mount the carrying body or platform, in the construction of which I preferably employ the longitudinal steel channels $c$, with wooden beams $c'$ secured between them, forming stringers, to which the supports are secured, and the frame is further strengthened by the cross-pieces $c^2$ as well as by the floor, which is nailed, bolted, or otherwise secured to the wooden beams of the stringers.

I preferably form the motor-carrying frame $d$ in a single casting adapted to also carry a counter-shaft and driving-gears, although said motor may be directly connected, the crank-shaft of the motor taking the place of the counter-shaft. One side of said frame I pivot to the rear axle $d'$ by the journals $d^2$, and the opposite side is preferably carried by the pin $d^3$, pivoted in the hanging frame $d^4$, which is pivoted at $d^5$ to the body or platform.

I securely bolt or otherwise secure the motor $e$ to the frame $d$, and on its crank-shaft I have shown two spur-pinions $e'$ of different diameters, adapted to mesh with spur-gears $e^2$ of correspondingly different diameters, formed on the periphery of a drum $e^3$ of a differential or compensating gear, said pinions being splined to said shafts, so that either one may be thrown into gear to give different speeds. I journal the counter-shaft $e^4$ at one end in the brass box $e^5$, and at the other end it carries a sleeve journaled in the box $e^6$, the bevel-gear $e^7$ being attached to said shaft and the bevel-gear $e^8$ to said sleeve, the pinion $e^9$, meshing with said gears, being pivoted to the inner periphery of the drum $e^3$, the arrangement being such as to drive the rear wheels independently of each other, the power being transmitted to the wheels through the pinions $e^{10}$, one on said shaft and the other on said sleeve, said pinions meshing with the gears $e^{11}$, attached to the hubs of the wheels, as shown.

It will be seen that the motor-carrying frame, being pivoted to the rear axle, always maintains its alinement parallel with said axle and keeps the driving-pinions in proper mesh with the gears on the carrying and driving wheel under the vibration caused by uneven roads or the passing of the machine over obstructions. Furthermore, by pivoting the opposite side of the frame at its transverse center the vertical movement caused by passing over obstructions on either side of the machine is compensated for.

I preferably secure the supply-tank $f$ and the boiler $f'$ to the under side of the body-platform, and the supply $f^2$ to the engine is flexibly connected to the boiler to compensate for the varying movement between the body and the motor-carrying frame, and the exhaust may be flexibly connected to the body in like manner. At the rear of the body I securely attach to the under side of the platform the water-tank $f^3$, which I also preferably secure to the end parts $b$ of the body-supports, which will more firmly hold the tank and further strengthen the body-carrying platform.

Upon each side of the water-tank I pivot the brake $g$ to bear against the rear wheels, pressure being applied by a single-acting piston and its rod $g'$, pivoted at $g^2$ to said brake. Steam or air may be used to drive the piston, the supply and exhaust to the cylinder being furnished by a three-way valve in a well-known manner or in any other suitable way, the brake being released and the piston returned by the tension-spring $g^3$.

Having thus described my invention, I claim—

1. The combination with a carrying-platform and the axles of a vehicle, of supports for said platform consisting of transverse frames having slotted ends therein, two-part bearing-blocks, the lower part adapted to engage said axle and rounded on top to receive the correspondingly-rounded bottom of the upper part, said blocks being adapted to fit and move in said slots, carrying-springs in said slots engaging said frames and carried by said bearing-blocks, substantially as specified.

2. The combination with a carrying-platform and the axles of a vehicle, of supports for said platform consisting of transverse frames cast in a single piece having slotted ends with guides therein, two-part bearing-blocks, the lower part recessed on the bottom to fit over said axles and rounded on top to receive the correspondingly-rounded bottom of the upper part, said parts each being adapted to fit in said slots and having projections thereon to move in said guides, carrying-springs in said slots engaging said frames and carried by said bearings, substantially as specified.

3. The combination with a carrying-platform and the axles of a vehicle, of supports for said platform consisting of transverse frames having slotted ends with guides therein and a bridge having a perforation therein, blocks recessed on their bottoms to fit over said axles and rounded on top, spindles with bases having rounded bottoms to correspond with and rest on said blocks, said blocks and spindle-bases being adapted to fit in said slots and each having projections thereon to move in said guides, springs interposed between said bridges and spindle-bases in said slots, said spindle projecting through said spring and the perforation in said bridge, substantially as specified.

4. The combination with a platform and axle of a vehicle, yielding supports for said platform carried by said axle, and a hanger pivoted to said platform, of a motor-carrying frame journaled at one end to said axle and pivoted at the opposite end to said hanger, said pivot being in the transverse center of the machine and said journals being on opposite sides of said center, substantially as and for the purpose specified.

5. The combination with a platform and axle of a vehicle, yielding supports for said platform carried by said axle, and a hanger pivoted to the respective sides of said platform, of a motor-carrying frame journaled at one end to said axle and pivoted at the opposite end to said hanger, said pivot being in the transverse center of the machine and said journals being on opposite sides of said center, substantially as and for the purpose specified.

6. The combination with a platform and axle of a vehicle, yielding supports for said platform carried by said axle, carrying-wheels on said axle and a hanger pivoted to the respective sides of said platform, of a motor-carrying frame journaled at one end on said axle and pivoted at the opposite end to said hanger, said pivot being in the transverse center of the machine and said journals on opposite sides of said center, a motor on said frame with connections to said wheels to drive said wheels independent of each other, substantially as specified.

7. The combination with a platform and axle of a vehicle, yielding supports for said platform carried by said axle, carrying-wheels on said axle and gears on said wheels, of a frame having oppositely-disposed journals substantially abutting the gears on said wheels, said frame being journaled at one end to said axle and pivoted at the opposite end to said platform, said pivot being in the transverse center of the machine and said journals being on opposite sides of said center, a motor on said frame and driving-shaft in the journals of said frame having pinions on each end thereof outside of said journals adapted to mesh with the gears on said wheels, and means, including a differential gear, on said shaft to drive said wheels independently of each other at different fixed speeds, substantially as specified.

8. The combination with a platform, a steam-generator, fuel-supply and water tanks secured to and depending from said platform, a vehicle-axle and yielding supports for said platform carried by said axle, carrying-wheels on said axle and gears on said wheels, and a hanger pivoted to the respective sides of said platform, of a steam-motor and a shaft driven by said motor, a frame extending substantially between said wheels and having oppositely-disposed journals abutting said gears to carry said motor and shaft, said frame being journaled at one end to said axle and pivoted at the opposite end to said hanger, said pivot being in the transverse center of the machine and said journals on opposite sides of said center, and means carried by said frame, including a differential gear, on said shaft, with connections to said motor and pinions on said shaft to mesh with the gears on said wheels to drive said wheels independently of each other at different fixed speeds, and a flexible steam-conduit from said generator to said motor, substantially as specified.

In testimony whereof I have hereunto set my hand this 22d day of May, A. D. 1902.

OLIVER W. KELLY.

Witnesses:
PERCY NORTON,
CHAS. I. WELCH.